(12) United States Patent
Tratar et al.

(10) Patent No.: US 7,946,581 B2
(45) Date of Patent: May 24, 2011

(54) ADJUSTABLE FORCE PINCH ROLLER

(75) Inventors: David B. Tratar, Dearborn, MI (US); Michael John Kiplinger, Kalamazoo, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 64 days.

(21) Appl. No.: 12/176,768

(22) Filed: Jul. 21, 2008

(65) Prior Publication Data

US 2010/0013141 A1 Jan. 21, 2010

(51) Int. Cl.
*B65H 5/02* (2006.01)
*B65H 5/04* (2006.01)

(52) U.S. Cl. ............ 271/274; 271/273; 74/567; 74/568; 74/569; 403/374.1; 403/401; 403/402; 492/25

(58) Field of Classification Search .......... 271/273, 271/274; 74/567–569; 403/374.1, 401, 402; 492/25

See application file for complete search history.

(56) References Cited

U.S. PATENT DOCUMENTS

| | | | | |
|---|---|---|---|---|
| 3,210,074 A * | 10/1965 | Miaskoff | | 271/273 |
| 3,416,790 A * | 12/1968 | Davis | | 271/273 |
| 4,627,607 A * | 12/1986 | Ishii | | 271/122 |
| 4,630,815 A * | 12/1986 | Petersen et al. | | 271/273 |
| 5,775,212 A * | 7/1998 | Takao | | 100/214 |
| 5,820,122 A * | 10/1998 | Schneider | | 271/188 |
| 5,884,909 A * | 3/1999 | Umeda | | 271/242 |
| 5,967,512 A * | 10/1999 | Irsik | | 271/273 |
| 6,343,787 B1 * | 2/2002 | Kato et al. | | 271/274 |
| 6,471,205 B2 * | 10/2002 | Lautenklos et al. | | 271/182 |
| 7,584,954 B2 * | 9/2009 | Nagao | | 271/122 |
| 7,686,300 B2 * | 3/2010 | Watanabe et al. | | 271/251 |
| 7,793,935 B2 * | 9/2010 | Wang | | 271/274 |
| 2001/0017438 A1 * | 8/2001 | Takamtsu | | 271/3.14 |
| 2005/0184455 A1 * | 8/2005 | Youn | | 271/274 |
| 2007/0029725 A1 * | 2/2007 | Marx et al. | | 271/272 |

* cited by examiner

*Primary Examiner* — Kaitlin S Joerger
*Assistant Examiner* — Prasad V Gokhale
(74) *Attorney, Agent, or Firm* — Honigman Miller Schwartz and Cohn LLP

(57) ABSTRACT

A pinch roller assembly useable in a document processing system is disclosed. The pinch roller assembly includes a pinch roller housing movable in a direction substantially perpendicular to a path of travel of documents. The pinch roller assembly also includes a pinch roller rotatably mounted to the pinch roller housing and located adjacent to the path of travel of documents, and a biasing member arranged to exert a biasing force on a deflection element. The deflection element directs the biasing force onto the pinch roller housing.

15 Claims, 8 Drawing Sheets

ADJUSTABLE FORCE PINCH ROLLER

TECHNICAL FIELD

The present disclosure relates generally to the field of document processing. In particular, the present disclosure relates to an adjustable force pinch roller.

BACKGROUND 100 billion check-based transactions are made in the United States each year. Many of these check transactions are still cleared by physical processing and transporting of the original printed paper check. When checks are processed for payment, the routing and account information on the front of the check is read, and images are captured of the front and back sides of the check to capture information written on the check by a payor and any endorsements on the back of the check by the payee. Check processing systems at financial institutions and consumer locations do so by passing a large number of checks through large check processing systems to enter these checks into the financial systems computers for payment. Recently, smaller and faster check processing systems, having shorter document travel distances, have been introduced for check processing at different types of places of business, thereby allowing the business to digitize the information on the check.

These various types of check processing systems, as well as other types of document processing systems, such as printing systems and scanning systems, require reliable throughput of documents. Generally, mechanisms are used that guide documents through a path of travel for scanning, printing, or other actions. These guide mechanisms include a belt-driven system having one or more drive rollers connected to a motor and arranged to drive the overall system. Additional mechanisms are generally required to ensure that documents remain within the path of travel, and pressed against the belt and/or drive rollers, so that the documents remain engaged and traveling through the system.

Existing systems use spring-biased idle rollers that are placed in positions opposed to drive rollers to ensure that documents remain within the path of travel. An example of such an idle roller configuration is shown in FIG. 1. As illustrated in that example, existing spring-biased rollers typically include a spring-biased arm that pivotally holds an idle roller against the drive roller on an opposite side of the path of travel of the documents in the system. The spring-biased arm applies a force equal to the force applied by the spring at the pivot point of the arm. The force is not generally adjustable, or controllable, despite the fact that springs used to implement these spring-biased rollers generally have different compression forces. For example, such springs can vary in applied force by 10% or more. Furthermore, existing idle rollers require a relatively large distance (seen as distance L) of track space to implement.

For these and other reasons, improvements are desirable.

SUMMARY

In accordance with the following disclosure, the above and other problems are solved by the following:

In a first aspect a pinch roller assembly is disclosed. The pinch roller assembly includes a pinch roller housing movable in a direction substantially perpendicular to a path of travel of documents. The pinch roller assembly also includes a pinch roller rotatably mounted to the pinch roller housing and located adjacent to the path of travel of documents, and a biasing member arranged to exert a biasing force on a deflection element. The deflection element directs the biasing force onto the pinch roller housing.

In a second aspect, a document processing system is disclosed. The document processing system includes a path of travel of documents defined by at least one drive roller. The document processing system also includes a pinch roller assembly located along the path of travel. The pinch roller assembly includes a pinch roller housing movable in a direction substantially perpendicular to the path of travel, and a pinch roller rotatably mounted to the pinch roller housing and located adjacent to the path of travel. The pinch roller assembly also includes a biasing member arranged to exert a biasing force on a deflection element. The deflection element transfers the biasing force to a transverse biasing force applied to the pinch roller housing in a direction generally perpendicular to the path of travel.

In a third aspect, a pinch roller assembly is disclosed. The pinch roller assembly includes a pinch roller housing movable in a direction substantially perpendicular to a path of travel of documents, and a pinch roller rotatably mounted at least partially within the pinch roller housing and located adjacent to the path of travel of documents. The pinch roller assembly also includes a spring arranged to exert a biasing force on a deflection element, and a mounting screw arranged in conjunction with the spring, the mounting screw capable of adjusting the biasing force exerted by the spring. The deflection element transfers the biasing force to a transverse biasing force applied to the pinch roller housing in the direction substantially perpendicular to the path of travel.

DETAILED DESCRIPTION

Figure 1:
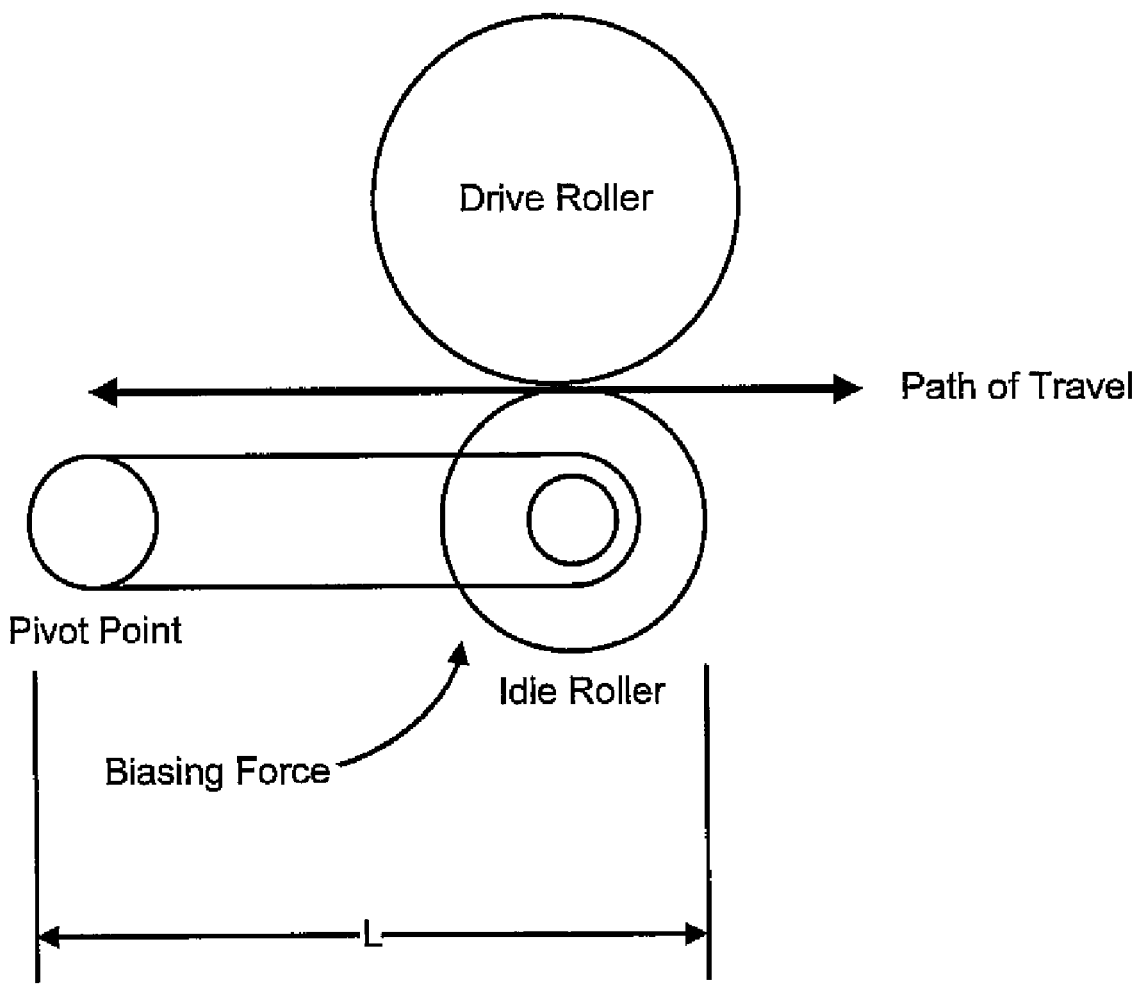
FIG. 1 is a top schematic view of a prior art idle roller arrangement.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a pinch roller assembly useable in a document processing system, such as a check processing system, a printer, or other movable-document systems. The pinch roller assembly of the present disclosure generally is designed to conserve lateral space along a document track, or path of travel of documents, allowing additional functional elements (e.g. scanning or printing elements) to be located along the track as well. By conserving space along the path of travel of documents, smaller devices with greater functionality can be manufactured. These smaller (and therefore generally lower-cost) document processing systems can be located at places of business or other locations where consumer transactions take place, to print receipts, process checks or other documents, or perform other computerized actions on printed documents.

Figure 2:
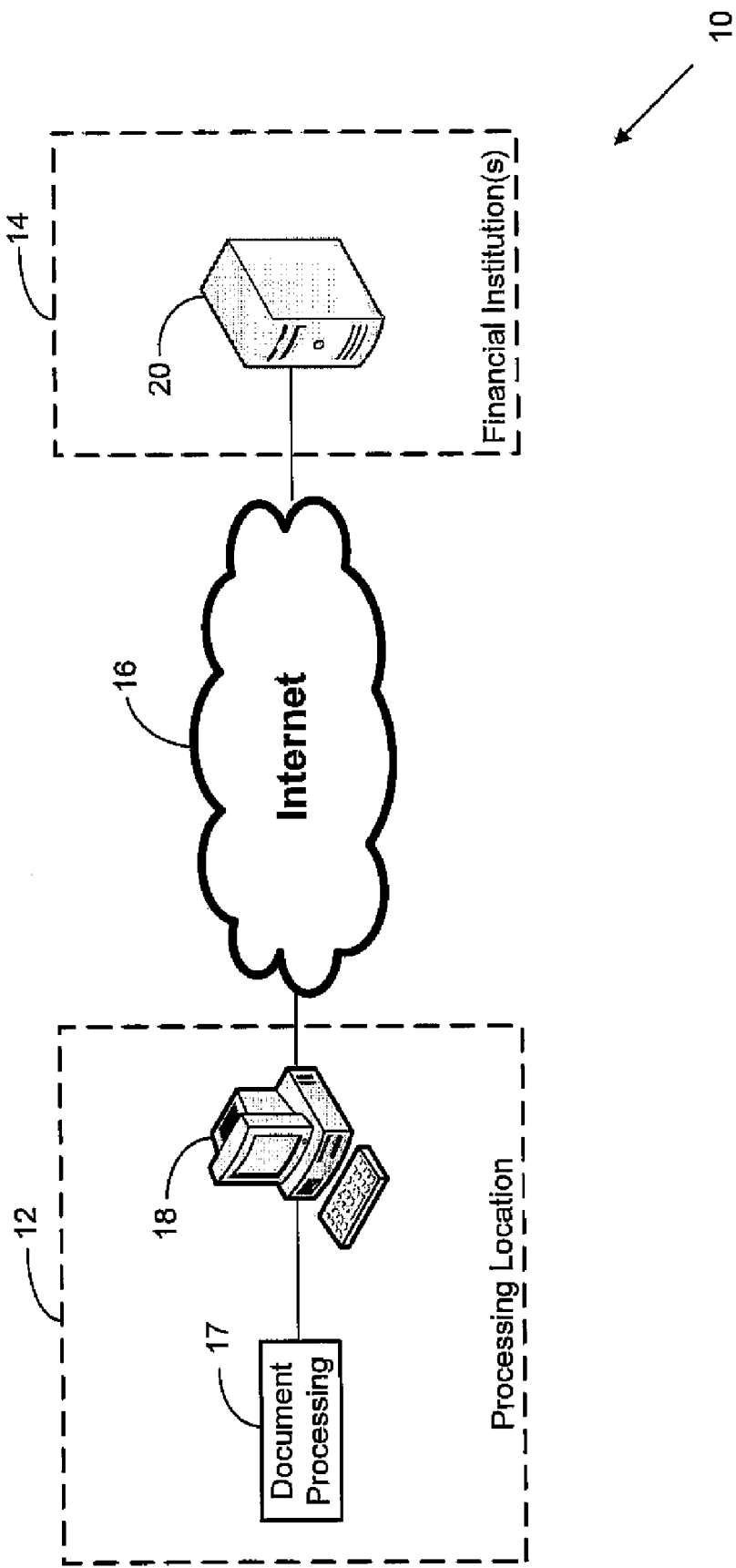
FIG. 2 is a schematic depiction of a network in which an electronic financial transaction may be placed, in accordance with the present disclosure.

One specific example of a system in which a document processing system may be used is shown in FIG. 2. FIG. 2 illustrates a schematic view of a network 10 in which a financial transaction may take place, according to a possible embodiment of the present disclosure. The network 10 generally includes one or more document processing locations 12 and financial institutions 14, communicatively connected by a network, shown as the internet 16. A document processing location 12 may be any of a number of places of business at which a financial transaction may take processed, such as a location of a purchase or sale of goods and services, or another financial institution. Each document processing location 12 includes a document processing system 17 interconnected with a computing system 18. The document processing system 17 is arranged to provide the transaction location with the ability to electronically acquire information about a printed document, such as a check used for payment in exchange for goods and/or services. In certain embodiments, the document processing system 17 can include a check scanner and magnetic character reader, a printing device, and various sorting devices for capturing and/or printing information on one or both sides of a check.

The computing system 18 can be any of a number of types of computing systems, such as a general purpose personal computer, or a specialized computer such as a cash register or inventory system. The computing system 18 can interconnect with the document processing system 17 by any of a number of standard or specialized communication interfaces, such as a USB, 802.11 a/b/g network, RF, infrared, serial, or other data connection. In certain embodiments, the computing system 18 runs an application configured to control the document processing system 17; in further embodiments, the computing system 18 receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check in which the electronic record includes the relevant information on the face of the check, the routing and institution number printed on the check, and an image of one or more sides of the check, used to validate the other, information and to display relevant endorsements of the check. Other electronically captured transactions, such as credit card transactions, contracts, or other negotiable instrument transactions may be tracked using the network 10 as well.

The internet connection 16 depicted can be any of a number of WAN, LAN, or other packet based communication networks such that data can be shared among a number of computing systems or other networked devices. Furthermore, although in the embodiment shown two computing devices 18, 20 at different, specific locations are depicted, the computing devices and/or the document processing system 17 may be located at the same location or within the same network.

Figure 3:
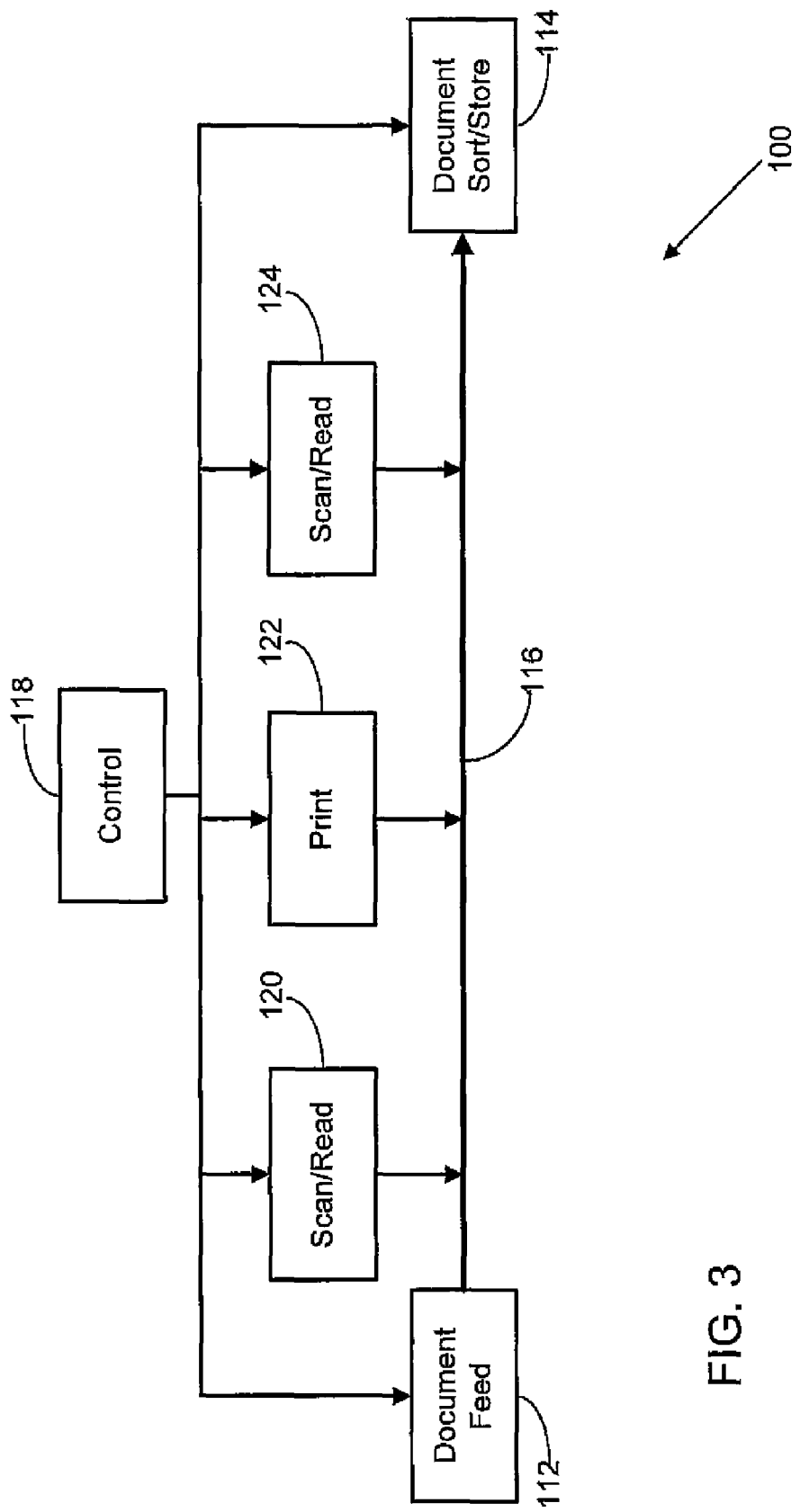
FIG. 3 is a schematic block diagram of an automated document processing system according to an embodiment of the present disclosure.

Referring now to FIG. 3, a document processing system 100 is shown in accordance with a possible embodiment of the present disclosure. The document processing system 100 provides an overview of the basic steps required to process documents, such as checks, in a high-volume system in which user supervision is minimized. The document processing system 100 can represent, for example, a possible embodiment of the document processing system 17 of FIG. 2.

In one embodiment, the document processing system 100 is a check processing system used to print and scan checks at a financial institution or document processing company. The document processing system 100 includes a document feeder 112 interconnected with a document sorter along a path of travel 116 of documents. The document feeder 112 is generally a document take-up mechanism provided with a large number of documents that are required to be processed. The document sorter 114 is an endpoint at which the documents have been processed, and can include one or more sorting mechanisms configured to arrange physical documents in a desired manner. The path of travel 116 may be defined by any of a number of document movement and/or guiding mechanisms, such as rollers, guides, or other systems able to grip and move documents from the feeder 112 to the sorter 114.

A control system 118 is interconnected to the document feeder 112 and the document sorter 114 to control flow of documents along the path of travel 116. The control system 118 can be an application level program configured to control flow and processing of documents. The control system 118 can reside on a general purpose or specific purpose computing system capable of communicating with the feeder 112 and sorter 114.

The control system 118 further directs a scanning system 120, a printing system 122, and a secondary scanning system 124. The scanning system 120 can scan one side of the documents passing along the path of travel 116, to store text and/or images displayed on the documents. The printing system 122 prints desired characters and/or images onto documents passing by the printing system along the path of travel 116. The printing system 122 can incorporate a print assembly which is configured to print from a stationary printing aperture onto moving documents passing by the printing system along the path of travel. In the example of a check processing system, the printing system 122 can print an endorsement onto the back of a check which is being processed at a financial institution operating the system 100. Other documents may be processed as well, by financial institutions or other document processing entities. The secondary scanning system 124 can scan and capture any information printed onto the documents by the printing system 122, thereby capturing initial and final states of the documents passing through the system 100.

Optionally (not shown), one or more document storage locations and/or exit points may lead from the path of travel 116 out from the system 100. These storage locations and exit points allow the control system an opportunity to pause documents along the path of travel 116, and to remove documents from the path of travel 116 prior to reaching the document sorter 114 in case of an error detected in scanning and/or printing.

By passing documents through the document processing system 100, a large volume of documents can be printed and electronically captured, such that various records can be stored for each of a large number of documents. In the case of a financial institution processing checks or other documents, that institution can endorse a large number of checks, can capture check images and routing information, and can appropriately sort the document for distribution back to the issuing institution of the check.

Figure 4:
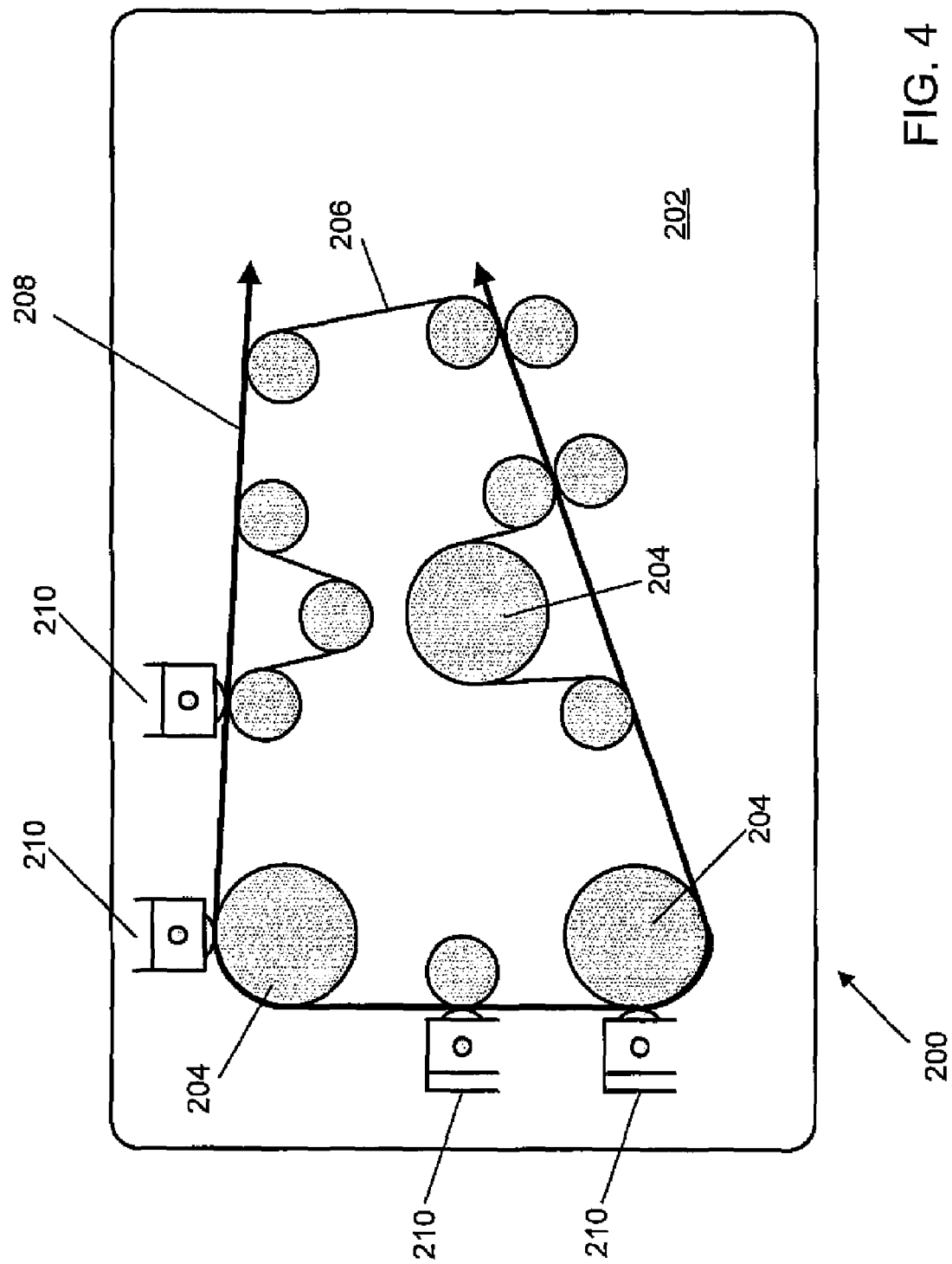
FIG. 4 is a top schematic view of a drive system for a document processing system, according to an embodiment of the present disclosure.

Now referring to FIG. 4, a top schematic view of a drive system 200 for a document processing system is shown according to an embodiment of the present disclosure. The drive system 200 includes a base plate 202, one or more drive rollers 204, and a drive belt 206. The base plate 202, in the embodiment shown, is a generally planar, rigid plate capable of receiving various components of a document processing system mounted thereon. In the embodiment shown, the base plate 202 is generally rectangular; however, the base plate can take any of a number of shapes, based on the desired size and shape of the document processing system in which it is incorporated.

The drive rollers 204 are in frictional contact with the drive belt 206. The drive rollers 204 are rotationally interdependent, in that rotation of one roller will cause rotation of the other rollers due to interconnection via the drive belt. At least one of the drive rollers 204 can be connected to a motor (not shown) which is configured to rotate the roller.

Drive rollers 204 and drive belt 206 define, at least in part, a path of travel of documents 208 in a document processing system. The path of travel 208 corresponds to a path traversed by documents during processing, such as printing, scanning, or other operations. In certain embodiments, the drive rollers 204 and drive belt 206 can be used in the document processing system 100 of FIG. 3 to define the path of travel 116.

The drive system 200 includes one or more pinch roller assemblies 210. The pinch roller assemblies 210 are arranged adjacent to the path of travel 208, and, in certain embodiments, assist in defining the path of travel of documents by defining an outer edge of the path of travel, opposing the drive rollers 204 and drive belt 206. In the embodiment shown, the pinch roller assemblies 210 are oriented in a direction generally perpendicular to a path of travel of documents, thereby defining an outer edge of the path of travel.

The pinch roller assemblies 210 each include, among other elements a pinch roller 212 and a housing 214. The pinch roller 212 is generally a cylindrical, rotatable element arranged to freely rotate when driven by either a drive roller (e.g. a drive roller 204) or a document passing the pinch roller. The pinch roller 212 is located and biased toward the path of travel to maintain documents passing along the path of travel. The housing 214 includes at least a portion that is movable in a direction substantially perpendicular to the path of travel 208, and is biased toward the path of travel. In certain embodiments, such as the embodiment shown in FIGS. 5-6, below, the housing includes a main pinch roller housing that holds the pinch roller 212 and a deflection element arranged to bias the pinch roller housing toward the path of travel. The housing 214 is mounted to the base plate 202 by a mounting fastener, shown as a mounting screw 216. Additional details regarding example pinch roller assemblies useable in the drive system 200 are described in greater detail below in conjunction with FIGS. 5-6.

Figure 5:
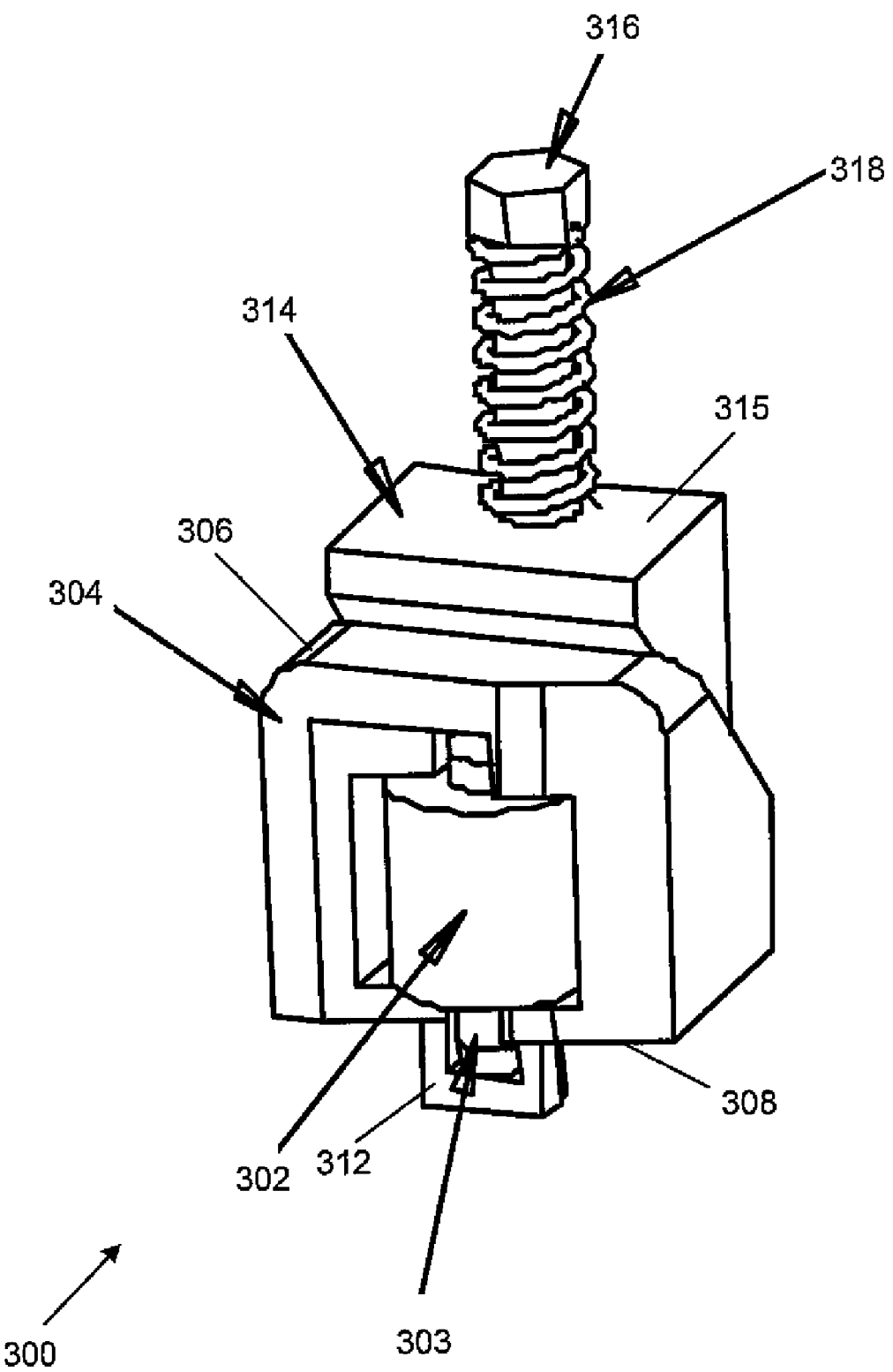
FIG. 5 is a front perspective view of a pinch roller assembly, according to a possible embodiment of the present disclosure.
Figure 6:
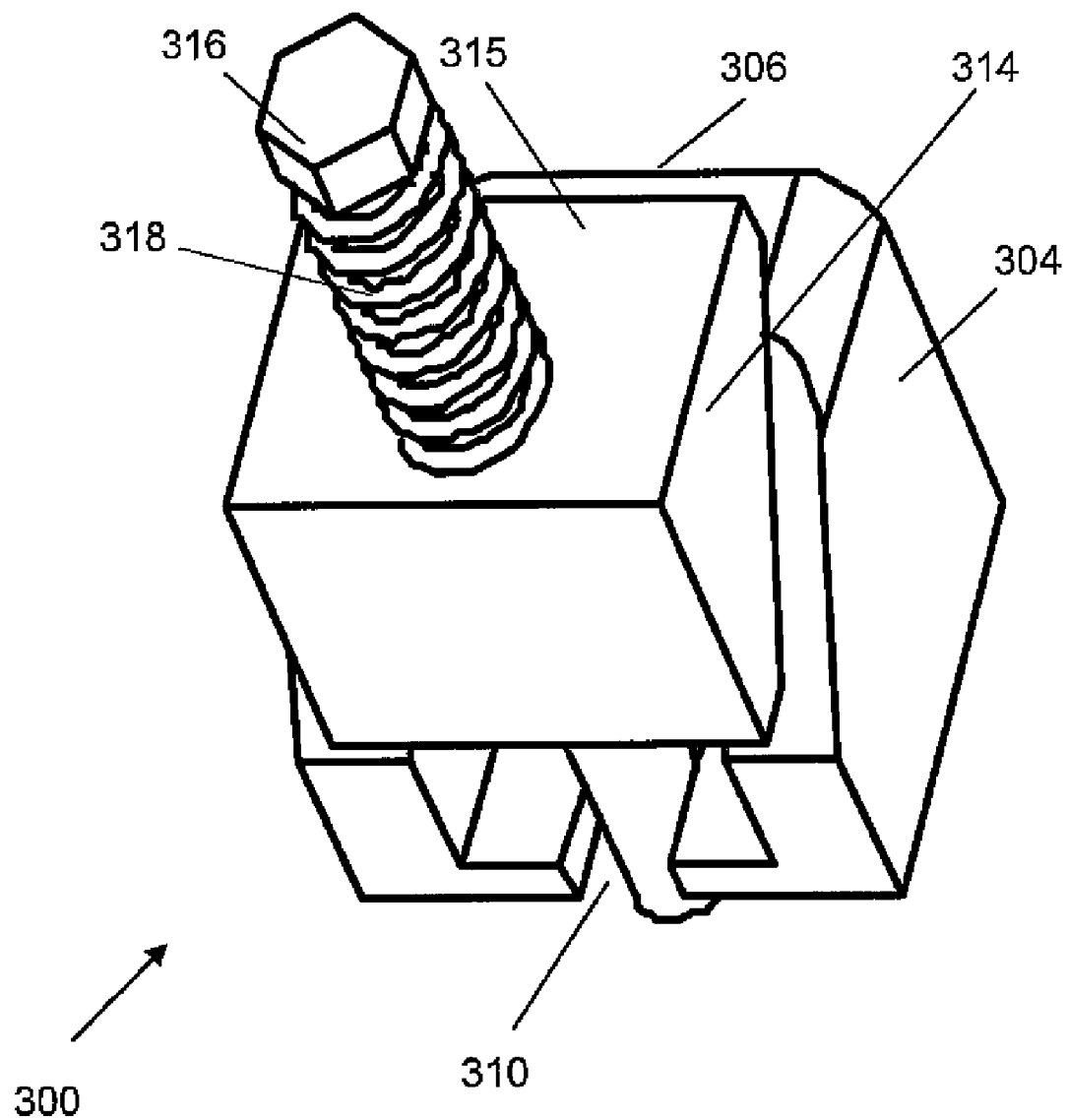
FIG. 6 is a top perspective view of the pinch roller assembly of FIG. 5.
Figure 7:
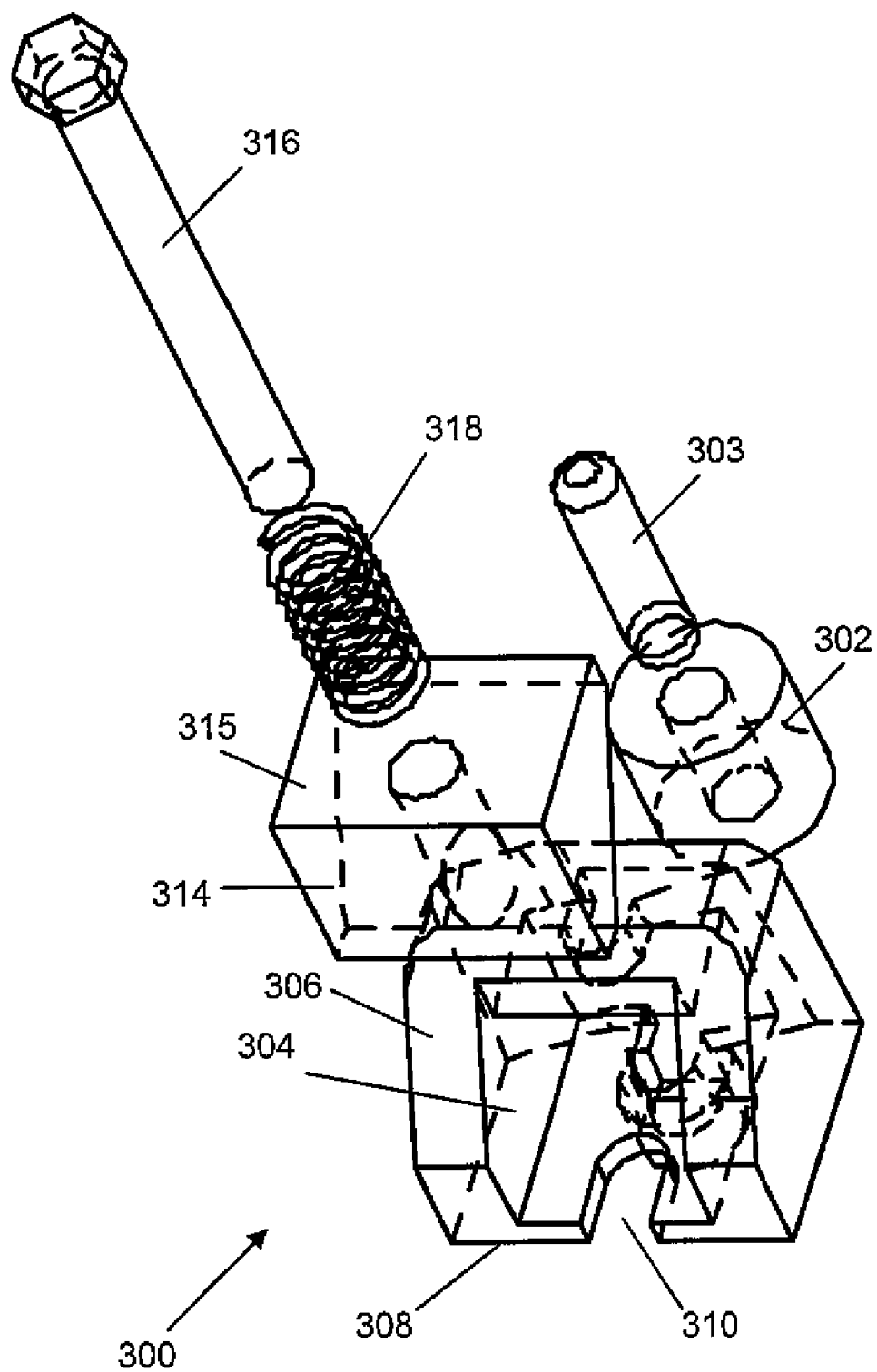
FIG. 7 is an exploded view of the pinch roller assembly of FIG. 5.

Referring now to FIGS. 5-7, an example pinch roller assembly 300 is shown according to a possible embodiment of the present disclosure. The pinch roller assembly 300 is generally arranged to bias a rotatable pinch roller toward an opposing roller or belt, such as can be found in a document processing system as previously described. The pinch roller assembly 300 generally includes a pinch roller 302 rotatably mounted to a pinch roller housing 304. The pinch roller 302 is generally cylindrical, and, in the embodiment shown is mounted at least partially within the pinch roller housing 304, allowing a portion of the roller 302 to be exposed at a front surface of the pinch roller assembly 300 for contacting a belt or other roller. The pinch roller housing 304 is generally of a horizontal size slightly larger than the pinch roller 302, thereby requiring little additional space along a path of travel when the assembly 300 is mounted to a planar surface (e.g. along a path of travel of documents). The pinch roller housing is generally movable when mounted to a planar surface, such as a base plate 202 of FIG. 4. The pinch roller housing 304 generally has an angled portion on a top side 306, and a generally flat bottom side 308. The pinch roller housing 304 also includes a central cavity arranged to receive the pinch roller 302. The pinch roller 302 is mounted to the pinch roller housing 304 by a shaft 303 that is generally vertical, and passes through the axis of the cylinder. The shaft 303 attached to the pinch roller housing 304 at the top side 306 and the bottom side 308 of the housing.

The pinch roller housing 304 includes a slot 310, which passes through a portion of the pinch roller housing 304 on a side generally opposite to the pinch roller 302. The slot 310 extends through the housing 304 from a side opposite the pinch roller 302 into the body of the housing. The slot 310 is sized to receive a fastener configured to connect the pinch roller assembly to a surface, such as a base plate of a document processing system. When the pinch roller assembly 300 is attached to a surface using a fastener connected through the slot 310, the pinch roller housing 304 is movable in a direction toward the pinch roller 302 (i.e., in certain embodiments, toward a path of travel of documents, as explained in FIGS. 3-4). In certain embodiments, a biasing force biases the pinch roller housing 304 toward the side having the pinch roller 302, thereby applying a force to the pinch roller, assisting it in rotating when it is placed opposed to a drive roller or belt.

Figure 8:
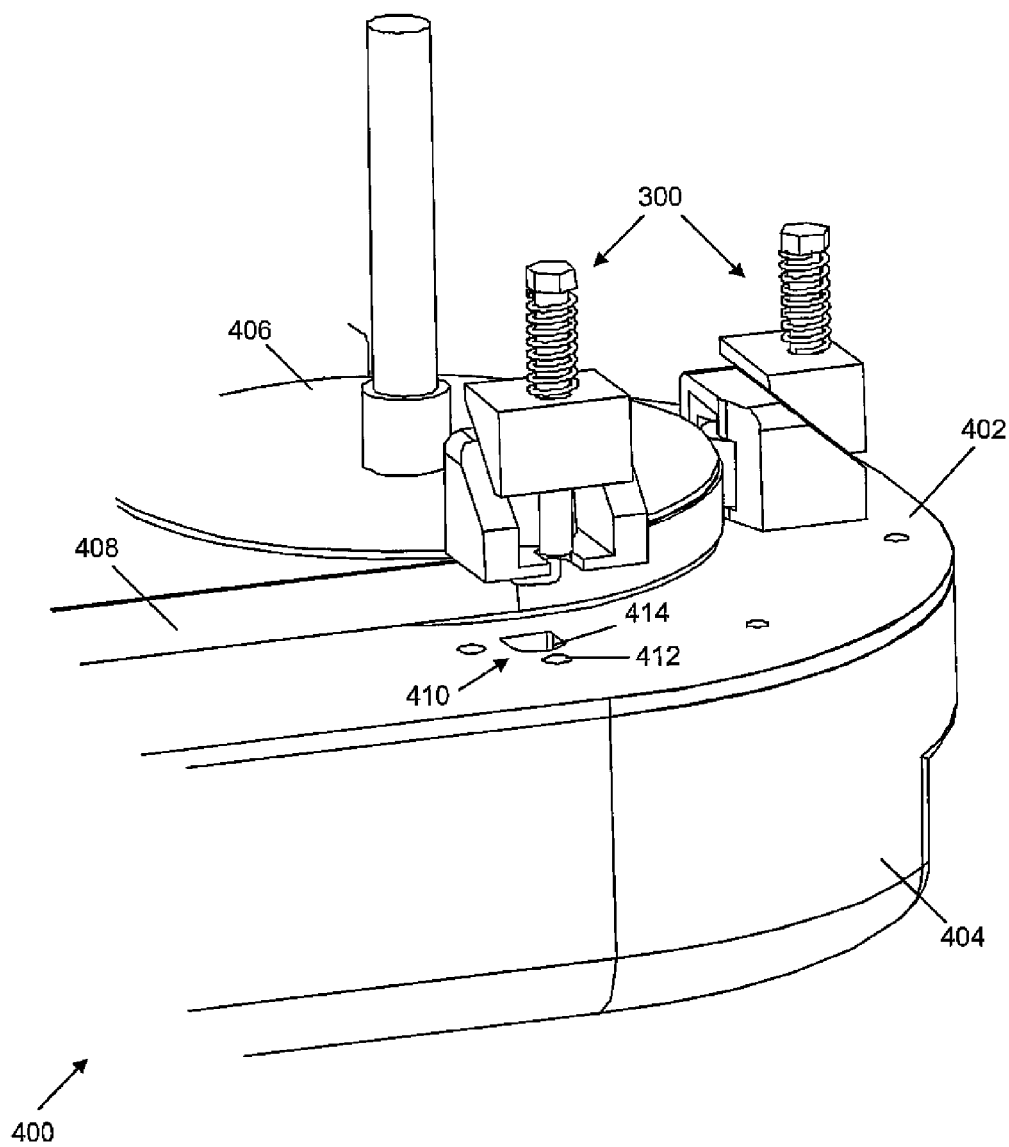
FIG. 8 is a side perspective view of a portion of a drive system for a document processing system, incorporating aspects of the present disclosure.

On the bottom side 308 of the pinch roller housing 304, the shaft 303 connects to the housing 304 in a guide extension 312, which extends below the bottom side 308. The guide extension 312 is sized to be received into a slot in a planar mounting surface, such as the base plate 202 of FIG. 2, to guide linear movement of the pinch roller housing 304. In one possible example, insertion of a guide extension 312 into an opening of a planar mounting surface is illustrated in FIG. 8, below.

A deflection element 314 is placed on the pinch roller housing 304, and includes an angled bottom side, arranged to be complementary to the angled portion of the top side of the pinch roller housing. In the embodiment shown, the deflection element 314 has a generally level top surface 315, and an opening to receive a fastening element used for fastening the pinch roller assembly 300 to a surface.

In the embodiment shown, a fastening element, shown as fastening screw 316, connects the pinch roller assembly to a planar surface located below the pinch roller housing 304. The fastening element allows linear movement of the pinch roller housing 304 when the pinch roller assembly 300 is connected to a surface, in that the fastening element is connected through the slot 310 in the housing. In further embodiments, other types of fastening elements can be used. For example, a bolt, clamp, or other type of fastener can be used.

A biasing member, shown as a spring 318, applies a force to the deflection element 314, causing the deflection element to apply a transverse biasing force to the pinch roller housing 304. In the embodiment shown, the spring 318 is a compression spring which applies a downward force to the deflection element 314. The deflection element 314 translates that force (by means of its shape) to the pinch roller housing 304 in a horizontal direction, biasing the pinch roller housing toward the pinch roller 302 and associated path of travel of documents, when installed in a document processing system.

In the embodiment shown, the biasing force applied by the compression spring 318 is caused by compressing the spring between a head of the fastening screw 316 and a top surface of the deflection element 314. In certain embodiments, the fastening screw 316 can be of different or adjustable length, so that the distance between a top portion (e.g. the head of a mounting screw) and the deflection element is variable. For example, where the fastening element is a fastening screw, the screw can be turned such that it mounts the pinch roller assembly 300 to the planar surface, leaving an adjustable height difference between the head of the screw 316 and the deflection element 314. A user can adjust this distance, for example, by turning the fastening screw. When the fastening screw is turned to decrease the distance between the head of the screw and the deflection element, the spring 318 increases the biasing force applied to the deflection element (and therefore to the pinch roller housing in a generally transverse direction). When the fastening screw is turned to increase the distance between the head of the screw 316 and the deflection element 314, the spring decreases the biasing force applied to the deflection element.

Through use of the screw 316 and spring 318, the biasing force applied to the pinch roller housing 304 (and therefore the pinch roller 302) is adjustable, allowing a user to adjust the biasing force such that all pinch roller assemblies have a similar biasing force applied thereto. Absent this adjustability, variations in the force applied by the spring 318 (which may vary by approximately 10% for similarly-rated springs) would necessarily result in variations in the biasing force.

FIG. 8 is a side perspective view of a portion of a drive system 400 for a document processing system, incorporating aspects of the present disclosure. The drive system 400 can, as shown, incorporate one or more pinch roller assemblies such as the assemblies 300 shown in FIGS. 5-7. The drive system 400 includes a base plate 402 upon which a number of drive systems can be mounted. The base plate 402, in the embodiment shown, is shown as part of a base housing 404, and includes a number of locations for mounting of various document processing components, including a drive roller 406, and one or more pinch roller assemblies, shown as the pinch roller assemblies 300 of FIGS. 5-6. The drive roller 406 can, in certain embodiments, be driven by a motor (not shown) mounted within the base housing 404. A drive belt 408 connects to the drive roller 406, and, as described in FIG. 2, at least partially defines a path of travel of documents in the drive system 400.

The pinch roller assemblies 300 mount to the base plate 402 in a direction facing a drive roller 406, drive belt 408, or other portions of the path of travel. The pinch roller assemblies 300 mount to mounting locations 410 in the base plate 402, which include a mounting screw receiving opening 412 and a guide extension opening 414. The mounting screw receiving opening 412 receives a mounting screw 318, while the guide extension opening 414 receives a guide extension 312 of the pinch roller housing 304.

Referring now to FIGS. 2-8 generally, it is understood that the pinch roller assembly of the present disclosure is described in use within a document processing system, such as a check processing system. However, the pinch roller assembly can be used in a broader range of applications, such as in other types of document printing, scanning, or transport systems. The document processing systems described herein are intended to provide an example environment in which the adjustable force pinch roller can be implemented. Through use of such a pinch roller assembly, additional components may be fit onto a base plate of a document processing system along a path of travel of documents, because the pinch rollers require less space than other types of pinch rollers. Furthermore, the pinch rollers provide additional flexibility and reliability, in that the biasing force can be adjusted to a constant, desired force.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A pinch roller assembly comprising:
 A pinch roller housing movable in a direction substantially perpendicular to a path of travel of documents;
 a pinch roller rotatably mounted to the pinch roller housing and located adjacent to the path of travel of documents; and
 a biasing member arranged to exert a biasing force on a deflection element;
 wherein the deflection element directs the biasing force onto the pinch roller housing, and wherein the pinch roller housing includes a slot sized to receive a mounting screw attaching the pinch roller assembly to a surface, the slot defining a range of movement of the pinch roller housing.

2. The pinch roller assembly of claim 1, further comprising a force adjustment mechanism arranged in conjunction with the biasing member, the force adjustment mechanism capable of adjusting the biasing force exerted by the biasing member.

3. The pinch roller assembly of claim 1, wherein the biasing force biases the pinch roller against a drive roller on an opposite side of the path of travel.

4. The pinch roller assembly of claim 1, wherein the biasing member is a compression spring.

5. The pinch roller assembly of claim 4, further comprising a mounting screw arranged to adjustably compress the spring to adjust the biasing force exerted by the spring.

6. The pinch roller assembly of claim 5, wherein the mounting screw mounts the pinch roller assembly to a surface of a document processing system.

7. A document processing system comprising:
 a path of travel of documents defined by at least one drive roller; a pinch roller assembly located along the path of travel, the pinch roller assembly including:
 a pinch roller housing movable in a direction substantially perpendicular to the path of travel;
 a pinch roller rotatably mounted to the pinch roller housing and located adjacent to the path of travel of documents; and
 a biasing member arranged to exert a biasing force on a deflection element;
 wherein the deflection element transfers the biasing force to a transverse biasing force applied to the pinch roller housing in a direction generally perpendicular to the path of travel, and wherein the pinch roller housing includes a slot sized to receive a bolt attaching the pinch roller assembly to a surface, the slot defining a range of movement of the pinch roller housing.

8. The document processing system of claim 7, wherein the pinch roller assembly is located on an opposite side of the path of travel from the drive roller.

9. The document processing system of claim 7, wherein the pinch roller assembly further includes a force adjustment mechanism arranged in conjunction with the biasing member, the force adjustment mechanism capable of adjusting the biasing force exerted by the biasing member.

10. The document processing system of claim 7, wherein the document processing system is configured to process checks.

11. The document processing system of claim 7, wherein the pinch roller assembly is slidably attached to a base plate by a mounting screw.

12. A pinch roller assembly comprising:

A pinch roller housing movable in a direction substantially perpendicular to a path of travel of documents;

a pinch roller rotatably mounted at least partially within the pinch roller housing and located adjacent to the path of travel of documents;

a spring arranged to exert a biasing force on a deflection element; and a mounting screw arranged in conjunction with the spring, the mounting screw capable of adjusting the biasing force exerted by the spring;

wherein the deflection element transfers the biasing force to a transverse biasing force applied to the pinch roller housing in the direction substantially perpendicular to the path of travel, and wherein the pinch roller housing includes a slot sized to receive the mounting screw, the slot defining a range of movement of the pinch roller housing.

13. The pinch roller assembly of claim 12, wherein the transverse biasing force biases the pinch roller against a drive roller on an opposite side of the path of travel.

14. The pinch roller assembly of claim 12, wherein the transverse biasing force biases the pinch roller against a drive roller on an opposite side of the path of travel.

15. The pinch roller assembly of claim 12, wherein the mounting screw mounts the pinch roller assembly to a surface of a document processing system.

* * * * *